US012737975B2

(12) United States Patent
Li et al.

(10) Patent No.: US 12,737,975 B2
(45) Date of Patent: Sep. 15, 2026

(54) METHOD AND APPARATUS FOR GENERATING 3D SCENE BASED ON LARGE LANGUAGE MODEL, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Yichen Li, Beijing (CN); Lei Wang, Beijing (CN); Xiaodong Zhang, Beijing (CN); Shiyan Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 202 days.

(21) Appl. No.: 18/748,080

(22) Filed: Jun. 19, 2024

(65) Prior Publication Data

US 2025/0124651 A1 Apr. 17, 2025

(30) Foreign Application Priority Data

Oct. 16, 2023 (CN) ......................... 202311336824.1

(51) Int. Cl.
*G06T 17/00* (2006.01)

(52) U.S. Cl.
CPC .......... *G06T 17/00* (2013.01); *G06T 2200/24* (2013.01); *G06T 2210/61* (2013.01)

(58) Field of Classification Search
CPC ...................................................... G06T 17/00
See application file for complete search history.

(56) References Cited

U.S. PATENT DOCUMENTS

2022/0044476 A1 2/2022 Ying et al.
2023/0377226 A1* 11/2023 Saharia .................. G06T 11/60
2024/0095077 A1* 3/2024 Singh .................... G06F 9/5027

FOREIGN PATENT DOCUMENTS

CN 111063037 A 4/2020
CN 115482324 A 12/2022
(Continued)

OTHER PUBLICATIONS

First Office Action for CN2023113368241, issued on Jul. 3, 2025, 7 pgs.

(Continued)

*Primary Examiner* — Shivang I Patel
(74) *Attorney, Agent, or Firm* — Kwan & Olynick LLP

(57) ABSTRACT

The present disclosure provides method and apparatus for generating 3D scene based on large language model, electronic device, and storage medium, which relates to the field of artificial intelligence technologies, particularly the fields of three-dimensional modeling technologies, large language model technologies, or the like. The three-dimensional scene generating method based on a large language model includes: processing description information of a target three-dimensional scene to obtain label information in the description information; generating query operation prompt of the LLM based on the label information, and acquiring a target asset set matched with the label information by the LLM based on the query operation prompt, the target asset set including a target asset in the target three-dimensional scene, target material information of the target asset and target scene attribute information of the target asset; and generating the target three-dimensional scene based on the target asset set.

14 Claims, 4 Drawing Sheets

Process description information of a target three-dimensional scene to obtain label information in the description information — 101

↓

Generate query operation prompt information of the LLM based on the label information, and acquire a target asset set matched with the label information by the LLM based on the query operation prompt information, the target asset set including a target asset in the target three-dimensional scenario, target material information of the target asset and target scene attribute information of the target asset — 102

↓

Generate the target three-dimensional scene based on the target asset set — 103

(56) References Cited

FOREIGN PATENT DOCUMENTS

| | | | |
|---|---|---|---|
| CN | 116310148 | A | 6/2023 |
| CN | 116340584 | A | 6/2023 |
| CN | 116721197 | A | 9/2023 |

OTHER PUBLICATIONS

Notice of Allowance for JP2024-100030, issued on May 7, 2025, 1 pg.
Angel X. Chang, et al., "SceneSeer: 3D Scene Design with Natural Language", arXiv:1703.00050v1, Feb. 28, 2017, 10 pgs.
First Office Action for KR1020240111084, issued on Mar. 16, 2026, 6 pgs.
Yining Hong, et al., "3D-LLM: Injecting the 3D World into Large Language Models", arXiv:2307.12981v1, Jul. 24, 2023, 19 pgs.

* cited by examiner

METHOD AND APPARATUS FOR GENERATING 3D SCENE BASED ON LARGE LANGUAGE MODEL, ELECTRONIC DEVICE, AND STORAGE MEDIUM

The present application claims priority to Chinese Patent Application No. 202311336824.1, entitled "Method and apparatus for generating 3D scene based on large language model, electronic device, and storage medium", filed on Oct. 16, 2023, the disclosure of which is incorporated herein by reference in its entirety.

FIELD OF THE DISCLOSURE

The present disclosure relates to the field of artificial intelligence technologies, particularly the fields of three-dimensional modeling technologies, large language model technologies, or the like, and particularly to method and apparatus for generating 3D scene based on large language model, electronic device, and storage medium.

BACKGROUND OF THE DISCLOSURE

With the development of an artificial intelligence technology, making of three-dimensional (3D) scenes is widely applied, for example, to a game industry, an animation industry, a digital human industry, or the like.

In the related art, the three-dimensional scene is usually artificially made by a designer in a rendering engine.

SUMMARY OF THE DISCLOSURE

The present disclosure provides method and apparatus for generating 3D scene based on large language model, electronic device, and storage medium.

According to an aspect of the present disclosure, there is provided a method for generating 3D scene based on large language model (LLM), including: processing description information of a target three-dimensional scene to obtain label information in the description information; generating query operation prompt of the LLM based on the label information, and acquiring a target asset set matched with the label information by the LLM based on the query operation prompt, the target asset set including a target asset in the target three-dimensional scene, target material information of the target asset and target scene attribute information of the target asset; and generating the target three-dimensional scene based on the target asset set.

According to another aspect of the present disclosure, there is provided an electronic device, including: at least one processor; and a memory connected with the at least one processor communicatively; wherein the memory stores instructions executable by the at least one processor to enable the at least one processor to perform a method for generating 3D scene based on large language model (LLM), the three-dimensional scene generating method based on a large language model including: processing description information of a target three-dimensional scene to obtain label information in the description information; generating query operation prompt of the LLM based on the label information, and acquiring a target asset set matched with the label information by the LLM based on the query operation prompt, the target asset set including a target asset in the target three-dimensional scene, target material information of the target asset and target scene attribute information of the target asset; and generating the target three-dimensional scene based on the target asset set.

According to another aspect of the present disclosure, there is provided a non-transitory computer readable storage medium storing computer instructions, wherein the computer instructions are used for causing a computer to perform a method for generating 3D scene based on large language model (LLM), the three-dimensional scene generating method based on a large language model including: processing description information of a target three-dimensional scene to obtain label information in the description information; generating query operation prompt of the LLM based on the label information, and acquiring a target asset set matched with the label information by the LLM based on the query operation prompt, the target asset set including a target asset in the target three-dimensional scene, target material information of the target asset and target scene attribute information of the target asset; and generating the target three-dimensional scene based on the target asset set.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

In the related art, since a three-dimensional scene is artificially made, an efficiency, accuracy, or the like, are problematic.

In order to improve the accuracy and efficiency of three-dimensional scene generation, the present disclosure provides the following embodiments.

Figure 1:
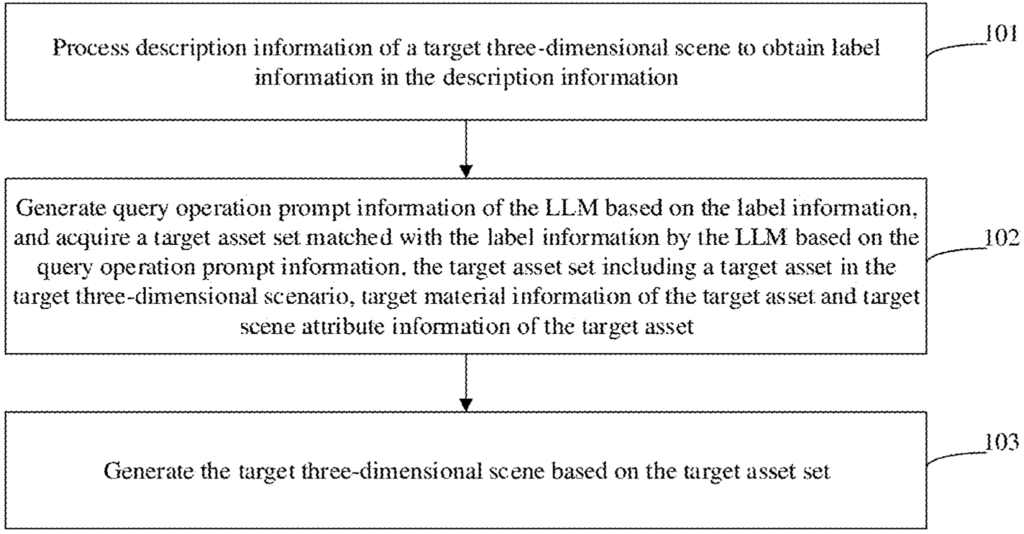
FIG. 1 is a schematic diagram according to a first embodiment of the present disclosure.

FIG. 1 is a schematic diagram according to a first embodiment of the present disclosure. The present embodiment provides a method for generating 3D scene based on large language model (LLM), including:

101: processing description information of a target three-dimensional scene to obtain label information in the description information;

102: generating query operation prompt of the LLM based on the label information, and acquiring a target asset set matched with the label information by the LLM based on the query operation prompt, the target asset set including a target asset in the target three-dimensional scene, target material information of the target asset and target scene attribute information of the target asset; and

103: generating the target three-dimensional scene based on the target asset set.

The description information refers to description information input by a user for the target three-dimensional scene. For example, the description information is "I want to generate a scene for game of a winter northern China forest, an earth road and a house composed of timber piles exist in the scene, white smoke is emitted from a chimney on the roof of the house, warm yellow light is transmitted through a window of the house, the tone is cool, and the style is realistic".

The label information refers to key information for the description information. For example, based on the above example, the label information includes "a scene, for game, winter, northern China, forest, an earth road, house composed of timber piles, white smoke is emitted from chimney, chimney on roof of house, warm yellow light is transmitted through window of house, cool tone, and realistic style".

After the label information is obtained, the target asset set matched with the label information can be acquired using the large language model (LLM). Input of the LLM includes a prompt, and the LLM generates corresponding output information based on the prompt.

In order to obtain the target asset set, the prompt of the LLM may be referred to as the query operation prompt, and the LLM performs query and obtains the target asset set matched with the label information based on the query operation prompt. The query operation prompt may include the above label information, and may further include instructing information, the instructing information is used to instruct the LLM to execute a query operation, and specific content of the instructing information is configurable. After receiving the query operation prompt, the LLM may obtain the target asset set based on the prompt.

A three-dimensional scene is composed of assets, including, for example, models, material spheres, maps, particles, or the like, the models including, for example, models of a house, a flower, grass, or the like.

The asset matched with the target three-dimensional scene is called the target asset. For example, if the label information includes a house, a house model is obtained as the target assets.

The target scene attribute information refers to related information of the target asset in the target three-dimensional scene, and includes, for example, a size, a position, a rotation angle, or the like.

The target material information refers to material related information of the target asset, such as a color, roughness, or the like.

After the target asset set is obtained, the target three-dimensional scene may be generated based on the target asset set. For example, the target asset of a corresponding size may be generated based on size information in the scene attribute information, and the generated target asset may be placed at a specified position in the scene attribute information.

In the related art, if only the target asset is obtained, since the scene attribute information of the target asset is uncertain. For example, the position of the model is determined randomly, the target asset is required to be further adjusted by the user, which increases complexity.

In the present embodiment, since the target asset set includes not only the target asset but also the scene attribute information and material information of the target asset, equivalently, the target asset, a material thereof, and the scene attribute information, such as the position, the size, or the like, are obtained at a time. Therefore, compared with a way of obtaining only the target asset, the three-dimensional scene can be generated simply, conveniently and efficiently. In addition, by generating the query operation prompt of the LLM, the target asset set can be acquired by adopting the LLM, thus improving a processing efficiency and accuracy.

In order to better understand the embodiment of the present disclosure, an application scene to which the embodiment of the present disclosure is applicable is described.

Figure 2:
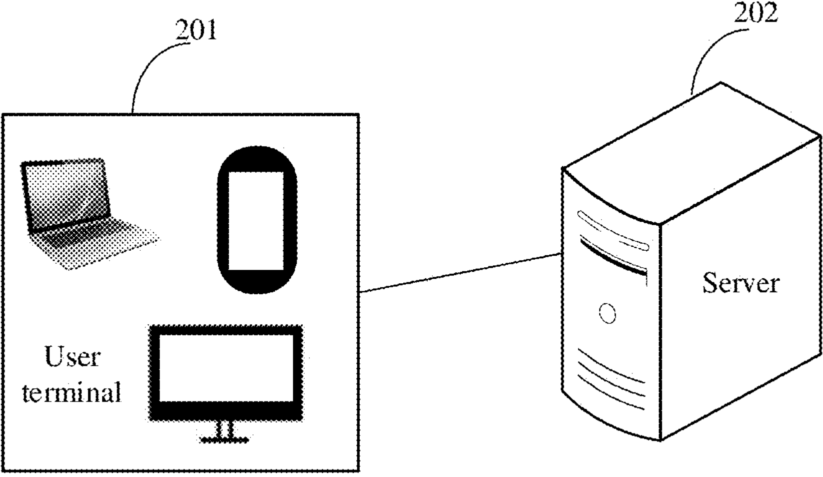
FIG. 2 is a schematic diagram of an application scene for implementing the embodiment of the present disclosure.

FIG. 2 is a schematic diagram of an application scene according to the embodiment of the present disclosure. The scene includes a user terminal 201 and a server 202; the user terminal 201 may include a personal computer (PC), a mobile device (such as a mobile phone), a tablet computer, a notebook computer, a smart wearable device, or the like; the server 202 may be a local server, a cloud server, or the like, and the server may be a single server or a server cluster.

Figure 3:
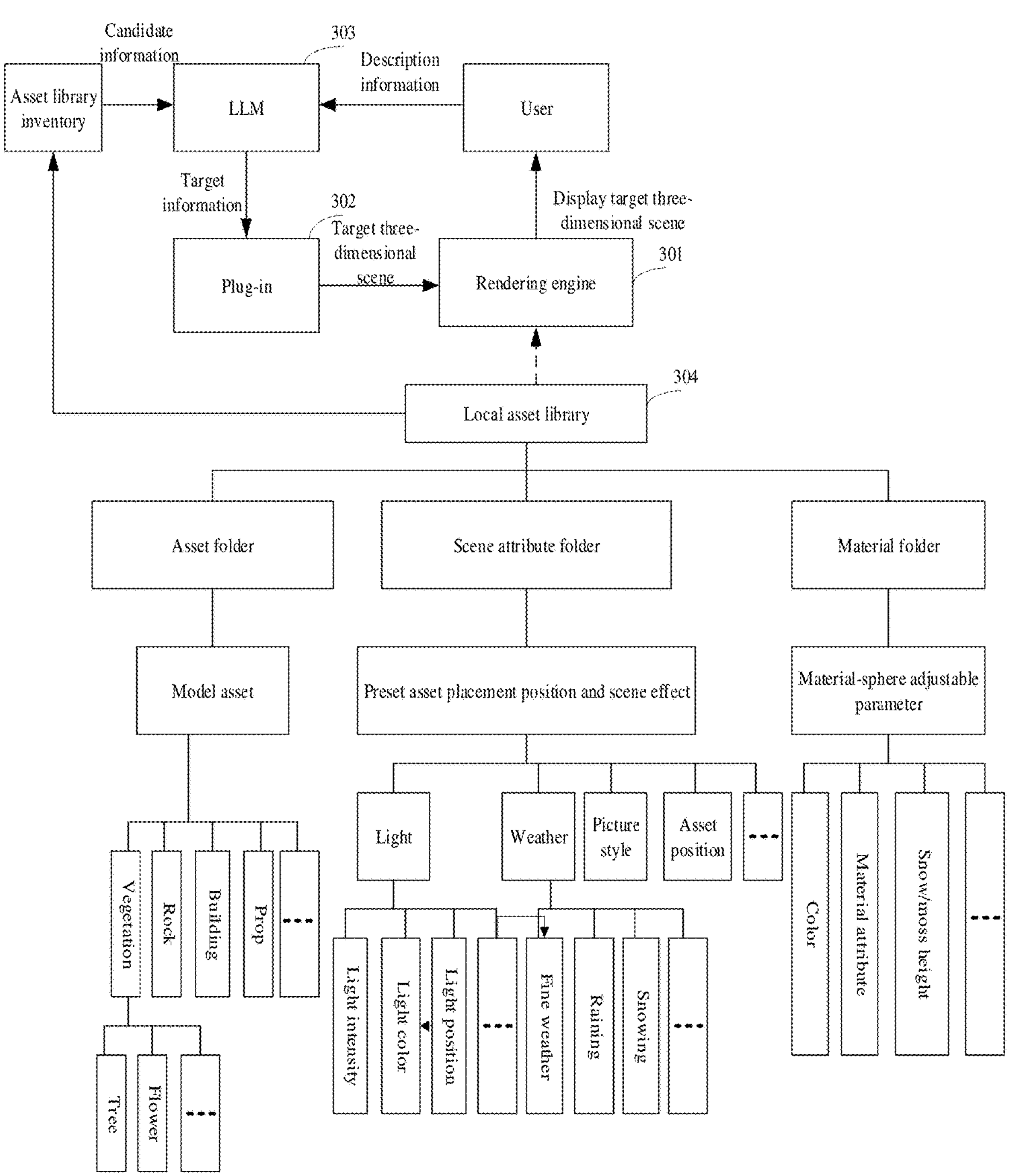
FIG. 3 is a schematic diagram of an overall architecture of a three-dimensional scene generating system based on a large language model according to the embodiment of the present disclosure.

As shown in FIG. 3, a system for generating 3D scene based on large language model includes: a rendering engine 301, a plug-in 302, a large language model (LLM) 303, and an asset library. The rendering engine 301 is deployed on the user terminal, which is, for example, Unity software, unreal engine (UE) software, or the like. And both the Unity software and the UE software (specifically, UE4 or UE 5) are real-time rendering engines capable of processing a dynamic image and performing three-dimensional rendering in real time. The plug-in 302 is pre-installed within the rendering engine. The LLM 303 is deployed on the server. The rendering engine 301 may call the LLM 303 through a preset interface to realize communication between the rendering engine 301 and the LLM 303. The asset library may be provided by the plug-in; or, in order to generate a three-dimensional scene with a more obvious user personal style, the asset library may be a user-customized local asset library. The asset library in FIG. 3 is represented by local asset library 304.

The LLM is a hot issue in the field of artificial intelligence in recent years, which is a pre-trained language model where rich language knowledge and world knowledge are learnt by performing pre-training on mass text data, such that a dramatic effect can be achieved on various natural language processing (NLP) tasks. Ernie Bot, ChatGPT, or the like, are all applications developed based on the LLM and can generate fluent, logical and creative text content, and even have natural conversations with humans. Specifically, the large language model may be a generative pre-trained transformer (GPT) model, an enhanced representation through knowledge integration (ERNIE) model, or the like.

The asset library includes assets, scene attribute information of the assets, and material information of the assets. Each type of information corresponds to a folder, which may be referred to as an asset folder, a scene attribute folder, and a material folder respectively. Each folder may be hierarchical. For example, for the asset folder, a first level is a model, a second level includes vegetation, rock, a building, a prop, or the like, and a third level corresponding to the vegetation includes a tree, a flower, or the like. For the scene attribute folder, the first level includes light, weather, a picture style, an asset position, or the like, and the second level corresponding to the light includes light intensity, a light color, a light position, or the like; the second level corresponding to the weather includes fine weather, raining, snowing, or the like. For the material folder, material-sphere adjustable parameters may be recorded, including for example: a color, a material property, a snow/moss height, or the like.

Taking the local asset library as an example, the above-mentioned various kinds of information (the asset, the material information and the scene attribute information) is created in advance by the user. The scene attribute information may be created by an asset set tool, which may be an asset management tool, such as a Variant Manager tool, or a level animation sequence tool, such as a LevelSequence tool. The Variant Manager tool and the LevelSequence tool are both asset set tools in the UE. The Variant Manager tool can combine various attributes of the asset position, the material sphere, the scene, or the like, into a set file, and the LevelSequence tool can realize dynamic switching of asset/scene attributes by setting a key frame.

Additionally, asset-related information within the local asset library may be recorded in an asset library inventory. The information recorded in the asset library inventory may be referred to as candidate information.

The rendering engine provides an interactive interface for the user, the interactive interface includes an input box. And the user can input the description information of the target three-dimensional scene in the input box, for example, "I want to generate a scene for game of a winter northern China forest, an earth road and a house composed of timber piles exist in the scene, white smoke is emitted from a chimney on the roof of the house, warm yellow light is transmitted through a window of the house, the tone is cool, and the style is realistic".

The rendering engine calls the LLM through the preset interface, and performs extraction on the description information by the LLM to obtain the label information. For example, based on the above description information, the extracted label information includes "a scene, for game, winter, northern China, forest, an earth road, house composed of timber piles, white smoke is emitted from chimney, chimney on roof of house, warm yellow light is transmitted through window of house, cool tone, and realistic style".

In the present embodiment, the label information in the description information is extracted by the LLM, such that more concise and accurate label information can be obtained based on the description information, thus improving accuracy of the target asset set obtained based on the label information, and improving accuracy and efficiency of generating the three-dimensional scene.

After the LLM obtains the label information, the label information may be matched with the candidate information (candidate asset information, candidate material information, and candidate scene attribute information) in the asset library inventory to obtain target information (target asset information, target material information, and target scene attribute information) matched with the label information. The target information is then sent to the plug-in.

The plug-in acquires the target asset set (the target asset and the corresponding target material information and target scene attribute information) based on the target information, and generates the target three-dimensional scene based on the target asset set.

After the rendering engine renders the target three-dimensional scene generated by the plug-in, the target three-dimensional scene is displayed to the user.

In combination with the application scene described above, the present disclosure further provides the following embodiment.

Figure 4:
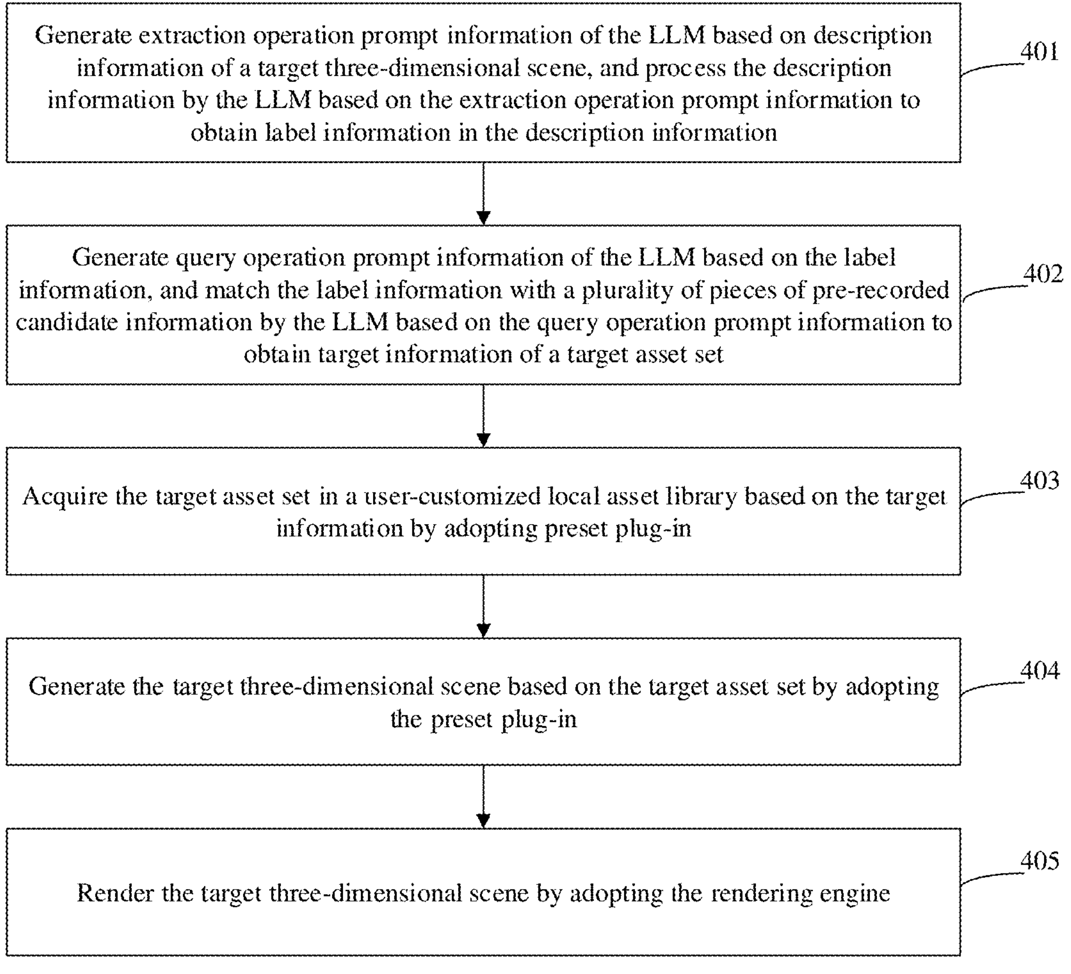
FIG. 4 is a schematic diagram according to a second embodiment of the present disclosure.

FIG. 4 is a schematic diagram according to a second embodiment of the present disclosure, and the present embodiment provides a method for generating 3D scene based on large language model, including:

401: generating extraction operation prompt of the LLM based on description information of a target three-dimensional scene, and processing the description information by the LLM based on the extraction operation prompt to obtain label information in the description information.

For example, a user inputs the description information by an interface provided by a rendering engine, such as "I want to generate a scene for game of a winter northern China forest, an earth road and a house composed of timber piles exist in the scene, white smoke is emitted from a chimney on the roof of the house, warm yellow light is transmitted through a window of the house, the tone is cool, and the style is realistic". The rendering engine calls the LLM through a preset interface, and the label information in the description information is extracted by the LLM; for example, the label information includes "a scene, for game, winter, northern China, forest, an earth road, house composed of timber piles, white smoke is emitted from chimney, chimney on roof of house, warm yellow light is transmitted through window of house, cool tone, and realistic style".

Specifically, the rendering engine may send prompt to the LLM, the prompt may be referred to as the extraction operation prompt, the extraction operation prompt includes the description information and instructing information, the instructing information is used to instruct the LLM to perform an information extraction operation, and specific content of the instructing information is configurable. The LLM can extract the label information in the description information based on the extraction operation prompt.

After the LLM obtains the label information, the label information can also be displayed to the user.

Further, the LLM may also determine importance of the label information, and display the label information in sequence based on the importance.

In the present embodiment, the label information in the description information is extracted by the LLM, such that more concise and accurate label information can be obtained based on the description information, thus improving accuracy of the target asset set obtained based on the label information, and improving accuracy and efficiency of generating the three-dimensional scene.

402: generating query operation prompt of the LLM based on the label information, and matching the label information with a plurality of pieces of pre-recorded candidate information by the LLM based on the query operation prompt to obtain target information of a target asset set.

The plurality of pieces of candidate information may be classified into three categories. The first category is asset information, for example, vegetation-north-tree and ground-forest-land, building-house-wood, particle-smoke-chimney, and other related assets); the second category is scene attribute information, for example, season-winter, layoutforest, tone-cool tone, style-realistic style, and light-window; and the third category is material information, for example, snow height, color hue, normal intensity, and roughness intensity. As an example, the asset information and the scene attribute information are represented hierarchically. For example, for vegetation, the first level is "vegetation", the second level is "north", the third level is "tree and ground", and so on, until the last level is recorded, such as "vegetation-north-tree and ground-forest-land" described above. Similarly, assuming that for the first level "vegetation", the second level also includes vegetation information "south", the relevant asset information may be represented as vegetation-south- . . . .

The plurality of pieces of candidate information may be recorded in an asset library inventory, and the LLM may obtain the target information matched with the label information based on a corresponding relationship learned in advance. For example, "winter" in the label information is matched with "winter", "snow", "ice", "cold", or the like, in an asset library.

In the present embodiment, the label information and the pre-recorded candidate information are matched to obtain the target information, such that the target information can be simply, conveniently and efficiently obtained, thus improving a processing efficiency.

403: acquiring the target asset set in a user-customized local asset library based on the target information by adopting preset plug-in. After the target information is obtained, the LLM may send the target information to the plug-in installed in the rendering engine in advance, and the plug-in may obtain the target asset set in the local asset library based on the target information.

In the present embodiment, by acquiring the target asset set in the user-customized local asset library, the user can configure a candidate asset and related information thereof according to needs of the user, such that the personalized target three-dimensional scene can be generated.

404: generating the target three-dimensional scene based on the target asset set by adopting the preset plug-in.

The target asset set includes a target asset and corresponding target material information and target scene attribute information, such that the plug-in can directly generate the target three-dimensional scene according to the information, and the user is not required to configure attributes, such as an asset position, or the like, thus facilitating an operation of the user.

Further, the plug-in can also generate an initial three-dimensional scene based on the target asset set; and adjust the initial three-dimensional scene based on scene function information in the label information to generate the target three-dimensional scene.

For example, the label information includes "for game", which is the scene function information, and the plug-in may pre-configure an operation corresponding to each function, and then may adjust the initial three-dimensional scene based on the pre-configured operation. For example, according to a preset adjustment rule for the game, the initial three-dimensional scene is adjusted in terms of a batch level of detail (LOD), light, a resolution, rendering quality, or the like, so as to obtain the target three-dimensional scene.

In the present embodiment, the initial three-dimensional scene is adjusted based on the scene function information to obtain the target three-dimensional scene, thus improving accuracy of the target three-dimensional scene, and improving a rendering effect.

405: rendering the target three-dimensional scene by adopting the rendering engine.

After the target three-dimensional scene is generated by adopting the plug-in, the rendering engine can render the target three-dimensional scene, and a rendering result is displayed to the user.

Further, after obtaining the rendering result, the user can modify the target three-dimensional scene as required. The modification can be performed based on the label information, or can be directly performed on the asset or the scene attribute information (such as the position) in the target three-dimensional scene.

Specifically, the label information may be displayed to the user; the label information modified by the user is acquired; and a modified target asset set is acquired based on the modified label information, and a modified target three-dimensional scene is generated based on the modified target asset set.

For example, the above-described label information includes "winter", the user may modify the label information to "summer", and then, the system regenerates a scene about summer.

In the present embodiment, the target three-dimensional scene is modified based on the modified label information, and the user is not required to perform a specific modification operation on the scene, such that the user operation can be simplified, and the processing efficiency can be improved.

In addition, the target three-dimensional scene can be displayed to the user; and the modified target three-dimensional scene is generated based on a modification instruction of the user.

The modification instruction is, for example, modification of the model in the target three-dimensional scene, modification of the position of the model, or the like, and the modified target three-dimensional scene may be obtained based on the modification instruction. For example, there exists a circular table in the target three-dimensional scene, and the user can modify the circular table into a square table directly in the scene.

In the present embodiment, the target three-dimensional scene is modified based on the modification instruction, such that the personalized modified target three-dimensional scene required by the user can be obtained.

Figure 5:
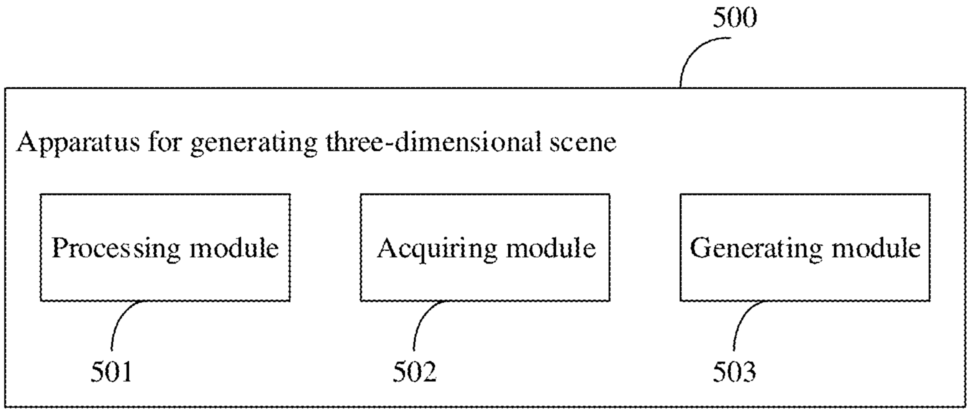
FIG. 5 is a schematic diagram according to a third embodiment of the present disclosure.

FIG. 5 is a schematic diagram according to a third embodiment of the present disclosure. The present embodiment provides an apparatus for generating 3D scene based on large language model. As shown in FIG. 5, the apparatus 500 includes: a processing module 501, an acquiring module 502 and a generating module 503.

The processing module 501 is configured to process description information of a target three-dimensional scene to obtain label information in the description information; the acquiring module 502 is configured to generate query operation prompt of the LLM according to the label information, and acquire a target asset set matched with the label information by the LLM based on the query operation prompt, the target asset set including a target asset in the target three-dimensional scene, target material information of the target asset and target scene attribute information of the target asset; and the generating module 503 is configured to generate the target three-dimensional scene according to the target asset set.

In the present embodiment, since the target asset set includes not only the target asset but also the scene attribute information and material information of the target asset, equivalently, the target asset, a material thereof, and the scene attribute information, such as a position, a size, or the like, are obtained at a time, and therefore, compared with a way of obtaining only the target asset, the three-dimensional scene can be generated simply, conveniently and efficiently.

In some embodiments, the processing module 501 is further configured to: generate extraction operation prompt of the LLM based on the description information, and process the description information by the LLM based on the extraction operation prompt to obtain the label information.

In the present embodiment, the label information in the description information is extracted by the LLM, such that more concise and accurate label information can be obtained based on the description information, thus improving accuracy of the target asset set obtained based on the label information, and improving accuracy and efficiency of generating the three-dimensional scene.

In some embodiments, the acquiring module 502 is further configured to: match the label information with a plurality of pieces of pre-recorded candidate information by the LLM based on the query operation prompt to obtain target information of the target asset set; and acquire the target asset set based on the target information.

In the present embodiment, the label information and the pre-recorded candidate information are matched to obtain the target information, such that the target information can be simply, conveniently and efficiently obtained, thus improving a processing efficiency.

In some embodiments, the acquiring module 502 is further configured to: acquire the target asset set in a user-customized local asset library based on the target information.

In the present embodiment, by acquiring the target asset set in the user-customized local asset library, the user can configure a candidate asset and related information thereof according to needs of the user, such that the personalized target three-dimensional scene can be generated.

In some embodiments, the generating module 503 is further configured to: generate an initial three-dimensional scene based on the target asset set; and adjust the initial three-dimensional scene based on scene function information in the label information to generate the target three-dimensional scene.

In the present embodiment, the initial three-dimensional scene is adjusted based on the scene function information to obtain the target three-dimensional scene, thus improving accuracy of the target three-dimensional scene, and improving a rendering effect.

In some embodiments, the apparatus 500 further includes:

a first modifying module configured to display the label information to the user; acquire the label information modified by the user; and acquire a modified target asset set based on the modified label information, and generate a modified target three-dimensional scene based on the modified target asset set.

In the present embodiment, the target three-dimensional scene is modified based on the modified label information, and the user is not required to perform a specific modification operation on the scene, such that the user operation can be simplified, and the processing efficiency can be improved.

In some embodiments, the apparatus 500 further includes:

a second modifying module configured to display the target three-dimensional scene to the user; and generate the modified target three-dimensional scene based on a modification instruction of the user.

In the present embodiment, the target three-dimensional scene is modified based on the modification instruction, such that the personalized modified target three-dimensional scene required by the user can be obtained.

It may be understood that in the embodiments of the present disclosure, mutual reference may be made to the same or similar contents in different embodiments.

It may be understood that "first", "second", or the like, in the embodiments of the present disclosure are only for distinguishing and do not represent an importance degree, a sequential order, or the like.

In the technical solution of the present disclosure, the collection, storage, usage, processing, transmission, provision, disclosure, or the like, of involved user personal information are in compliance with relevant laws and regulations, and do not violate public order and good customs.

According to the embodiment of the present disclosure, there are also provided an electronic device, a readable storage medium and a computer program product.

Figure 6:
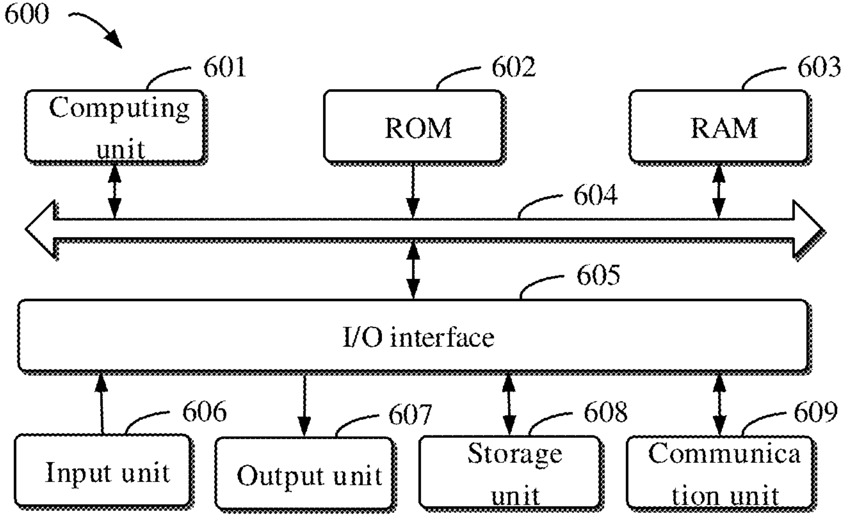
FIG. 6 is a schematic diagram of an electronic device configured to implement a method for generating 3D scene based on large language model according to the embodiment of the present disclosure.

FIG. 6 shows a schematic block diagram of an exemplary electronic device 600 which may be configured to implement the embodiment of the present disclosure. The electronic device 600 is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the electronic device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the electronic device 600 may be also stored in the RAM 603. The computing unit 601, the ROM 602, and the RAM 603 are connected with one other through a bus 604. An input/output (I/O) interface 605 is also connected to the bus 604.

The plural components in the electronic device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the electronic device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the three-dimensional scene generating method based on a large language model. For example, in some embodiments, the three-dimensional scene generating method based on a large language model may be implemented as a computer software program tangibly contained in a machine readable medium, such as the storage unit 608. In some embodiments, part or all of the computer program may be loaded and/or installed into the electronic device 600 via the ROM 602 and/or the communication unit 609. When the computer program is loaded into the RAM 603 and executed by the computing unit 601, one or more steps of the three-dimensional scene generating method based on a large language model described above may be performed. Alternatively, in other embodiments, the computing unit 601 may be configured to perform the three-dimensional scene generating method based on a large language model by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A method for generating a 3D scene based on large language model (LLM), comprising:

processing description information of a target three-dimensional scene to obtain label information in the description information, comprising: generating an extraction operation prompt of the LLM based on the description information, and processing the description information by the LLM based on the extraction operation prompt to obtain the label information, wherein the label information is key information for the description information;

generating a query operation prompt of the LLM based on the label information, and acquiring a target asset set matched with the label information by the LLM based on the query operation prompt, the target asset set comprising a target asset in the target three-dimensional scene, target material information of the target asset and target scene attribute information of the target asset, wherein the target asset set is acquired based on a target information by adopting preset plug-in, the target information is obtained by matching the label information with a plurality of pieces of pre-recorded candidate information based on a corresponding relationship learned in advance by the LLM, the plurality of pieces of candidate information are classified into a plurality of categories which represent asset information, scene attribute information and material information respectively; and generating the target three-dimensional scene based on the target asset set.

2. The method according to claim 1, wherein the acquiring the target asset set based on the target information comprises:

acquiring the target asset set in a user-customized local asset library based on the target information.

3. The method according to claim 1, wherein the generating the target three-dimensional scene based on the target asset set comprises:

generating an initial three-dimensional scene based on the target asset set; and adjusting the initial three-dimensional scene based on scene function information in the label information to generate the target three-dimensional scene.

4. The method according to claim 1, further comprising:

displaying the label information to a user;

acquiring the label information modified by the user; and acquiring a modified target asset set based on the modified label information, and generating a modified target three-dimensional scene based on the modified target asset set.

5. The method according to claim 1, further comprising:

displaying the target three-dimensional scene to the user; and generating the modified target three-dimensional scene based on a modification instruction of the user.

6. An electronic device, comprising:

at least one processor; and a memory connected with the at least one processor communicatively;

wherein the memory stores instructions executable by the at least one processor to enable the at least one processor to perform a method for generating a 3D scene based on large language model (LLM), the method for generating the 3D scene based on large language model comprising:

processing description information of a target three-dimensional scene to obtain label information in the description information, comprising: generating an extraction operation prompt of the LLM based on the description information, and processing the description information by the LLM based on the extraction operation prompt to obtain the label information, wherein the label information is key information for the description information;

generating a query operation prompt of the LLM based on the label information, and acquiring a target asset set matched with the label information by the LLM based on the query operation prompt, the target asset set comprising a target asset in the target three-dimensional scene, target material information of the target asset and target scene attribute information of the target asset, wherein the target asset set is acquired based on a target information by adopting preset plug-in, the target information is obtained by matching the label information with a plurality of pieces of pre-recorded candidate information based on a corresponding relationship learned in advance by the LLM, the plurality of pieces of candidate information are classified into a plurality of categories which represent asset information, scene attribute information and material information respectively; and generating the target three-dimensional scene based on the target asset set.

7. The electronic device according to claim 6, wherein the acquiring the target asset set based on the target information comprises:

acquiring the target asset set in a user-customized local asset library based on the target information.

8. The electronic device according to claim 6, wherein the generating the target three-dimensional scene based on the target asset set comprises:

generating an initial three-dimensional scene based on the target asset set; and adjusting the initial three-dimensional scene based on scene function information in the label information to generate the target three-dimensional scene.

9. The electronic device according to claim 6, wherein the method further comprises:

displaying the label information to the user; acquiring the label information modified by the user; and acquiring a modified target asset set based on the modified label information, and generating a modified target three-dimensional scene based on the modified target asset set.

10. The electronic device according to claim 6, wherein the method further comprises:

displaying the target three-dimensional scene to the user; and generating the modified target three-dimensional scene based on a modification instruction of the user.

11. A non-transitory computer readable storage medium with computer instructions stored thereon, wherein the computer instructions are used for causing a computer to perform a method for generating a 3D scene based on large language model (LLM), the method for generating the 3D scene based on large language model comprising:

processing description information of a target three-dimensional scene to obtain label information in the description information, comprising: generating an extraction operation prompt of the LLM based on the description information, and processing the description information by the LLM based on the extraction operation prompt to obtain the label information, wherein the label information is key information for the description information;

generating a query operation prompt of the LLM based on the label information, and acquiring a target asset set matched with the label information by the LLM based on the query operation prompt, the target asset set comprising a target asset in the target three-dimensional scene, target material information of the target asset and target scene attribute information of the target asset, wherein the target asset set is acquired based on a target information by adopting preset plug-in, the target information is obtained by matching the label information with a plurality of pieces of pre-recorded candidate information based on a corresponding relationship learned in advance by the LLM, the plurality of pieces of candidate information are classified into a plurality of categories which represent asset information, scene attribute information and material information respectively; and generating the target three-dimensional scene based on the target asset set.

12. The non-transitory computer readable storage medium according to claim 11, wherein the acquiring the target asset set based on the target information comprises:

acquiring the target asset set in a user-customized local asset library based on the target information.

13. The non-transitory computer readable storage medium according to claim 11, wherein the generating the target three-dimensional scene based on the target asset set comprises:

generating an initial three-dimensional scene based on the target asset set; and adjusting the initial three-dimensional scene based on scene function information in the label information to generate the target three-dimensional scene.

14. The non-transitory computer readable storage medium according to claim 11, wherein the method further comprises:

displaying the label information to a user;

acquiring the label information modified by the user; and acquiring a modified target asset set based on the modified label information, and generating a modified target three-dimensional scene based on the modified target asset set.

* * * * *